United States Patent
Steuter et al.

(10) Patent No.: US 10,596,741 B2
(45) Date of Patent: Mar. 24, 2020

(54) BLOWN FILM EXTRUSION DEVICE AND METHOD FOR CONTROLLING THE TEMPERATURE

(71) Applicant: Windmöller & Hölscher KG, Lengerich (DE)

(72) Inventors: Henning Steuter, Tecklenburg (DE); Jens Goldenstein, Osnabrück (DE); Markus Bussmann, Essen (DE)

(73) Assignee: Windmöller & Hölscher KG, Lengerich (DE)

( * ) Notice: Subject to any disclaimer, the term of this patent is extended or adjusted under 35 U.S.C. 154(b) by 297 days.

(21) Appl. No.: 14/906,878

(22) PCT Filed: May 28, 2014

(86) PCT No.: PCT/EP2014/061023
§ 371 (c)(1),
(2) Date: Jan. 21, 2016

(87) PCT Pub. No.: WO2015/010811
PCT Pub. Date: Jan. 29, 2015

(65) Prior Publication Data
US 2016/0158990 A1 Jun. 9, 2016

(30) Foreign Application Priority Data
Jul. 26, 2013 (DE) .................. 10 2013 108 045

(51) Int. Cl.
*B29C 48/78* (2019.01)
*B29C 48/86* (2019.01)
(Continued)

(52) U.S. Cl.
CPC .............. *B29C 48/86* (2019.02); *B29C 48/30* (2019.02); *B29C 48/32* (2019.02); *B29C 48/78* (2019.02);
(Continued)

(58) Field of Classification Search
CPC ....... B29C 47/86; B29C 47/864; B29C 47/92; B29C 48/78; B29C 48/86; B29C 48/865;
(Continued)

(56) References Cited

U.S. PATENT DOCUMENTS 3,650,644 A * 3/1972 Ebert ................. A22C 13/0003
425/326.1
4,895,744 A * 1/1990 Briggs ................ B29C 47/0023
264/209.7
(Continued)

FOREIGN PATENT DOCUMENTS

DE 6945123 U 4/1970
DE 1729129 A1 6/1971
(Continued)

OTHER PUBLICATIONS

Hydraulics & Pneumatics, "Synchronizing cylinder movement", Book 2, Chapter 22, Published Dec. 5, 2010, Accessed Sep. 13, 2017,<www.hydraulicspneumatics.com>.*
(Continued)

*Primary Examiner* — Robert C Dye
*Assistant Examiner* — Sonny V Nguyen
(74) *Attorney, Agent, or Firm* — Haynes Beffel & Wolfeld LLP; Warren S. Wolfeld; Andrew L. Dunlap

(57) ABSTRACT

The invention relates to a blown film extrusion device with a blow head and with an insulation, which comprises a heat resistance for thermal insulation of the blow head in relation to the outer ambient air, wherein the blown film extrusion device comprises elements for controlling the heat resistance.

6 Claims, 6 Drawing Sheets

Figure 4:
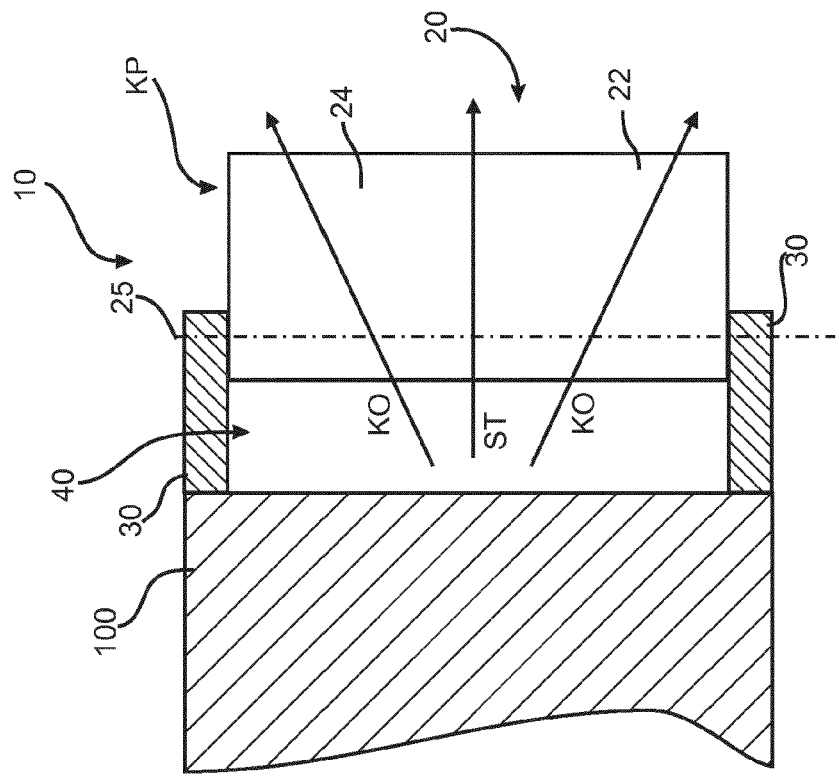

(51) Int. Cl.
    *B29C 48/87*       (2019.01)
    *B29C 48/92*       (2019.01)
    *B29C 48/30*       (2019.01)
    *B29C 48/32*       (2019.01)
    B29C 48/00       (2019.01)
    B29C 48/10       (2019.01)
    B29C 49/04       (2006.01)
    B29L 7/00         (2006.01)

(52) U.S. Cl.
    CPC ............ *B29C 48/865* (2019.02); *B29C 48/87* (2019.02); *B29C 48/92* (2019.02); *B29C 48/0018* (2019.02); *B29C 48/10* (2019.02); *B29C 49/04* (2013.01); *B29C 2948/926* (2019.02); *B29C 2948/92704* (2019.02); *B29L 2007/008* (2013.01)

(58) Field of Classification Search
    CPC ..... B29C 48/87; B29C 48/872; B29C 48/875; B29C 48/88; B29C 48/10; B29C 48/30; B29C 48/32; B29C 49/04
    See application file for complete search history.

(56) References Cited

U.S. PATENT DOCUMENTS

| | | | |
|---|---|---|---|
| 5,580,582 A | 12/1996 | Achelpohl | |
| 6,065,953 A * | 5/2000 | Bentivoglio | B29C 48/30 425/143 |
| 6,238,613 B1 * | 5/2001 | Batchelder | B29C 47/0033 137/13 |
| 9,266,274 B2 * | 2/2016 | Christiano | B29C 47/0811 |
| 2006/0275523 A1 | 12/2006 | Marzano | |
| 2007/0098834 A1 * | 5/2007 | Mirek | B29C 47/0026 425/378.1 |
| 2010/0040716 A1 * | 2/2010 | Fridley | B29B 9/065 425/6 |
| 2012/0090819 A1 * | 4/2012 | Christiano | B29C 48/92 165/96 |
| 2013/0221557 A1 * | 8/2013 | Yonesato | B29C 43/08 264/40.6 |
| 2014/0093640 A1 * | 4/2014 | Briskey | B29C 48/865 427/120 |
| 2015/0266227 A1 * | 9/2015 | Rubbelke | B29C 47/0026 264/510 |

FOREIGN PATENT DOCUMENTS

| | | |
|---|---|---|
| DE | 2629789 A1 | 1/1978 |
| DE | 4207439 A1 | 6/1993 |
| DE | 19644910 A1 | 5/1997 |
| EP | 0096179 A2 | 12/1983 |
| GB | 1396164 A | 6/1975 |
| GB | 1528728 A | 10/1978 |
| JP | S61254324 A | 11/1986 |

OTHER PUBLICATIONS

CN 201480037774—Chinese Office Action dated Oct. 10, 2016, 13 pages (English translation included).
PCT/EP2014/061023—International Search Report dated Sep. 26, 2014, 3 pages (English translation).
PCT/EP2014/061023—German Office Action dated Feb. 26, 2014, 7 pgs (English translation).
EP14726618—Intention to Grant and English transmaton of claims dated Apr. 4, 2019, 11 pages.

* cited by examiner

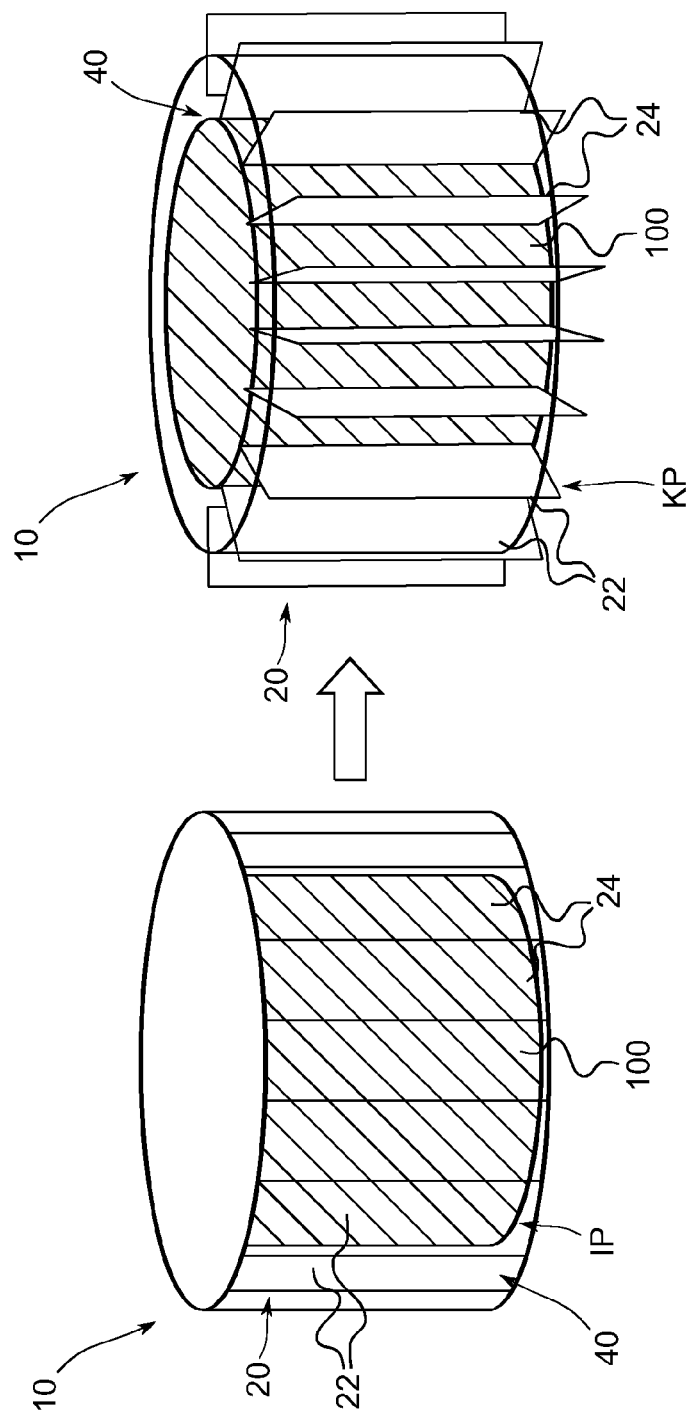

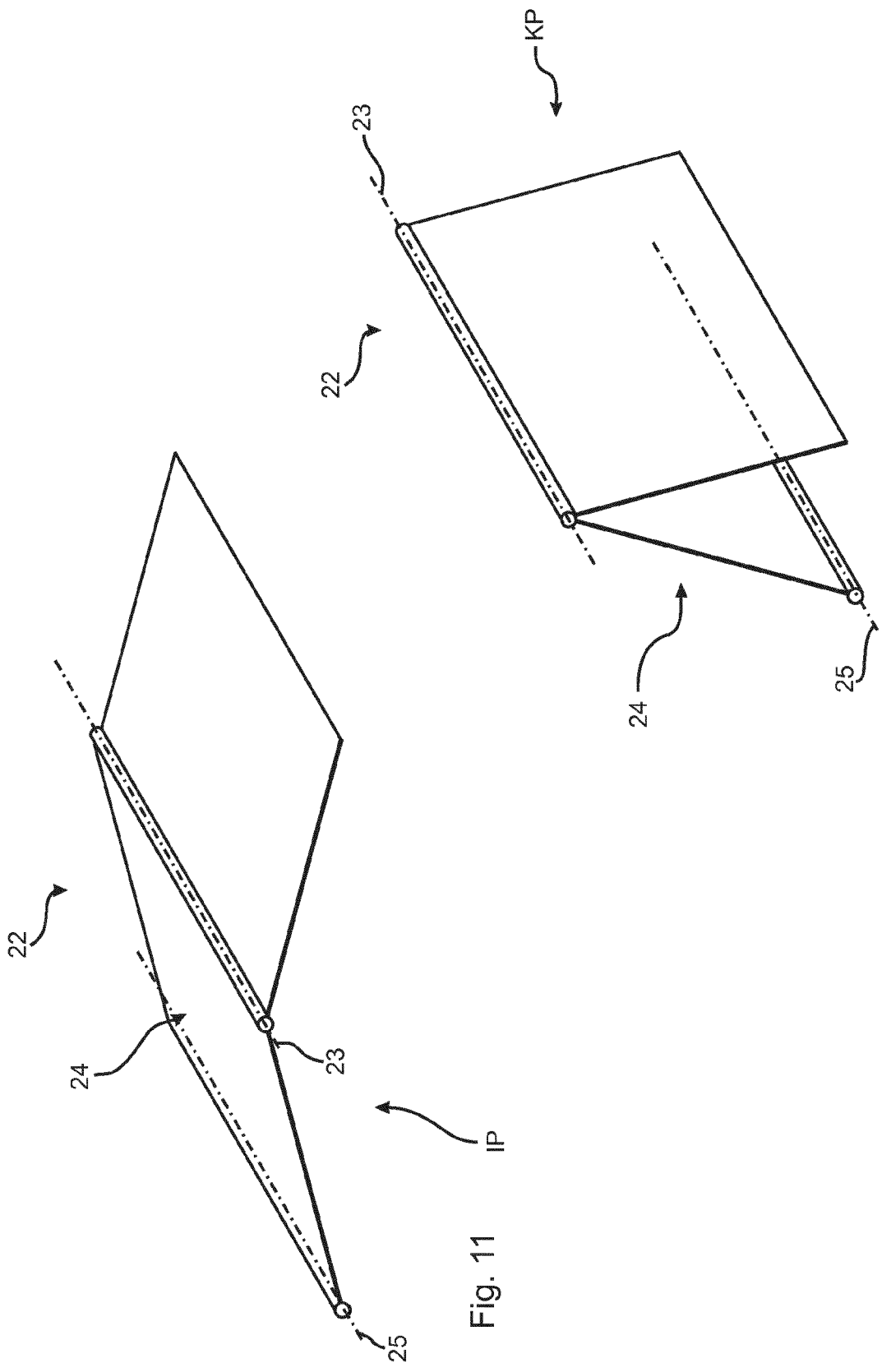

BLOWN FILM EXTRUSION DEVICE AND METHOD FOR CONTROLLING THE TEMPERATURE

The present invention relates to a blown film extrusion device, a temperature controller for a blown film extrusion device and a method for controlling the temperature of a blown film extrusion device.

The production of blown films occurs in a known manner in that an annular tube is configured in a thermoplastic melt prepared by an extruder via a blown film extrusion device, which is laid flat via an extractor device and is coiled on a roller to form roles in a usable dimension. The tube preparation is achieved in that in the blown film extrusion device a blow head with an annular nozzle gap is intended from which the melt escapes during the extractor process supported by an outer and inner air stream and is blown to the desired format. The outer ambient air stream and also the inner air stream are cooled down, whereby the melt reaches the so called freezing limit (freeze area) and the desired tube dimensions are fixed with extent and thickness.

At the same time however, the blow head has to be kept in a certain temperature in the areas of the melting ducts with heating capacities of some kW to 100 kW, which corresponds to the temperature of the thermoplastic melt. In order to hereby reduce the power dissipation for example heat insulating hoods are known for example from DE 1 729 129 A1, which insulate the blow head in respect to the outer ambient air.

Object of the invention is to improve the heating of the blow head of a blown film extrusion device.

This object is solved by a blow head extrusion device, a temperature control and a method for controlling the temperature.

The blown film extrusion device according to the invention comprises a blow head and an insulation, which comprises a thermal resistance for thermal insulation of the blow head in respect to the outer ambient air, wherein the blown film extrusion device comprises elements for controlling the thermal resistance.

With the elements for controlling the thermal resistance according to the invention the thermal resistance can be selectively altered in relation to the outer ambient air, wherein the control can basically occur manually (for example by using a control lever) and/or automatically. Hereby, a faster exchange of the thermal resistance can be achieved, which increases the temperature control of the whole blow head, namely during the heating process (for example during the start of the whole unit) and also during the cooling process (for example during the shutdown of the whole unit).

According to a preferred embodiment the thermal resistance comprises means for thermal separation. This can be gaseous and also solid media.

For example, the means for thermal separation can comprise at least an air gap. The thermal resistance of the at least one air gap can be controlled in a way that the air stream is influenced in the at least one air gap. For influencing the air stream thereby for example a blower with electrically controllable blower performance can be intended. Alternatively or additionally it is possible that for influencing the air stream movable flaps are intended. In the closed state the flaps shield the air gap from the outer ambient air. In the open state the flaps enable a circulation with the outer ambient air by convection and/or by thermal radiation and/or by an air stream produced by a blower. Preferably, the flaps are connected to one another with a gear. In this manner it is possible that all present flaps can be operated by an operator at the same time using one single control lever. Alternatively and/or additionally it is possible that the flaps can be controlled in a motor-driven manner in a separate manner or together via the gear.

It can be an advantage when the elements for controlling the thermal resistance comprise at least one flap, which can be movably mounted between an insulation position closing the air gap and a cooling position opening the air gap. Here, the actuation of the cooling or the cooling itself can occur passively and/or actively. Is the flap opened and therewith in the cooling position, it is possible that at least by a convection heat can be removed from the air gap and therewith from the blow head. This convection can additionally or alternatively be configured positively driven by a blower. According to the assembly and size of the respective flap in the opened cooling position further thermal radiation can escape from the blow head through the opening which is released by the flap in the open position. Therewith, by a configuration of the flap and the corresponding geometric correlation to the blow head a selection can be done how strong the respective flap influences the thermal resistance towards the outer ambient air. Naturally, also two or more flaps can be intended, which can be operated particularly with different cooling manners and different cooling performances. In the simplest and most cost-efficient manner all flaps are equally configured so that by opening all flaps the maximum cooling performance can be achieved. Therewith, a maximum reduction of the necessary time for cooling down the blow head is reached. Naturally, also different cooling manners for example the combination of thermal pipes, thermal convection and thermal radiation are possible.

According to a preferred embodiment the heat resistance in the at least one air gap can be controlled in a way that a low pressure or a vacuum is generated in the air gap according to the principal of a thermos flask.

According to a preferred embodiment the means for thermal separation comprise a solid insulating material particularly ceramic, which can be incorporated within the insulation gap. The elements for controlling the thermal resistance can thereby influence the position of the solid insulation material within the insulation gap. While in a position the solid insulation material generates a high thermal resistance in relation to the outer ambient air, the thermal resistance can be decreased when the solid insulation material is transferred in another position. Preferably, the position of the solid insulation material is thereby controllable in a motor-driven manner.

According to a preferred embodiment the means for thermal separation comprise a layer with pipes flown through with oil, wherein the oil is tempered to the desired temperature in an external tempering unit by heating or cooling.

According to a further preferred embodiment, the means for thermal separation comprise a layer with Peltier elements. A Peltier element is an electric thermal transformer, which generates a temperature difference based on the Peltier effect during a current flow or which generates a current flow (Seebeck effect) during temperature differences. Peltier elements can hereby be used for cooling and also—during an inversion of the current direction—for heating.

The temperature regulation according to the invention for the blown film extrusion device comprises a first control signal for controlling the heat performance of a heater integrated in the blow head and a second control signal for controlling the elements for controlling the heat resistance.

With the method according to the invention for a temperature regulation of a blown film extrusion device with a first control signal the heat performance of a heater integrated in the blow head is controlled and with the second control signal the elements for controlling the heat resistance are controlled.

According to a preferred embodiment the temperature regulation during shutdown of the unit is aligned in a way that the heat resistance can be altered to a particularly low value in order to enable a possibly fast cooling down of the blow head.

According to a preferred embodiment the temperature regulation during the operation is aligned in a manner that the controllable heat resistance can serve as a further variable beneath the blow head heater for regulating the blow head temperature. For example thereby the temperature of the blow head can be reduced rapidly during the operation as soon as due to the high melting temperature the blow head tends to overheat or the blow head temperature has to be reduced due to other method related reasons.

Figure 3:
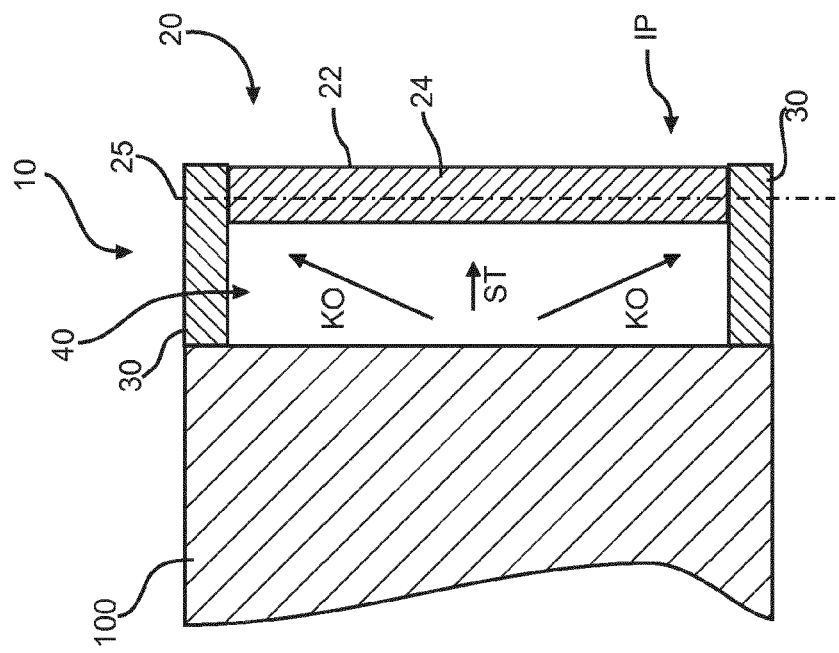
Figure 6:
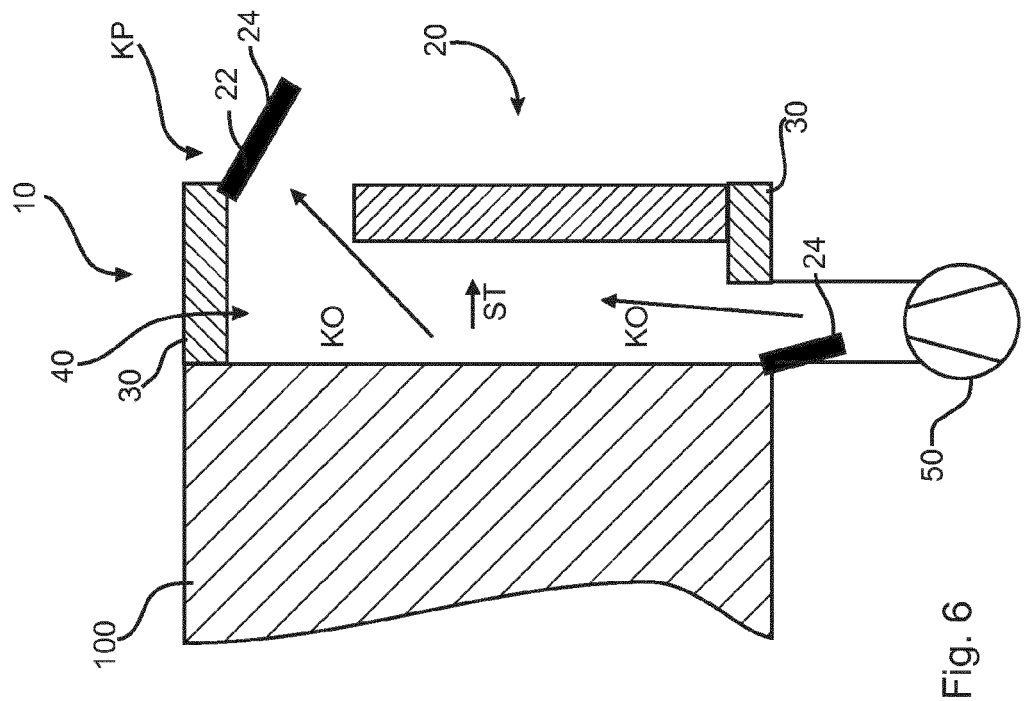
Figure 5:
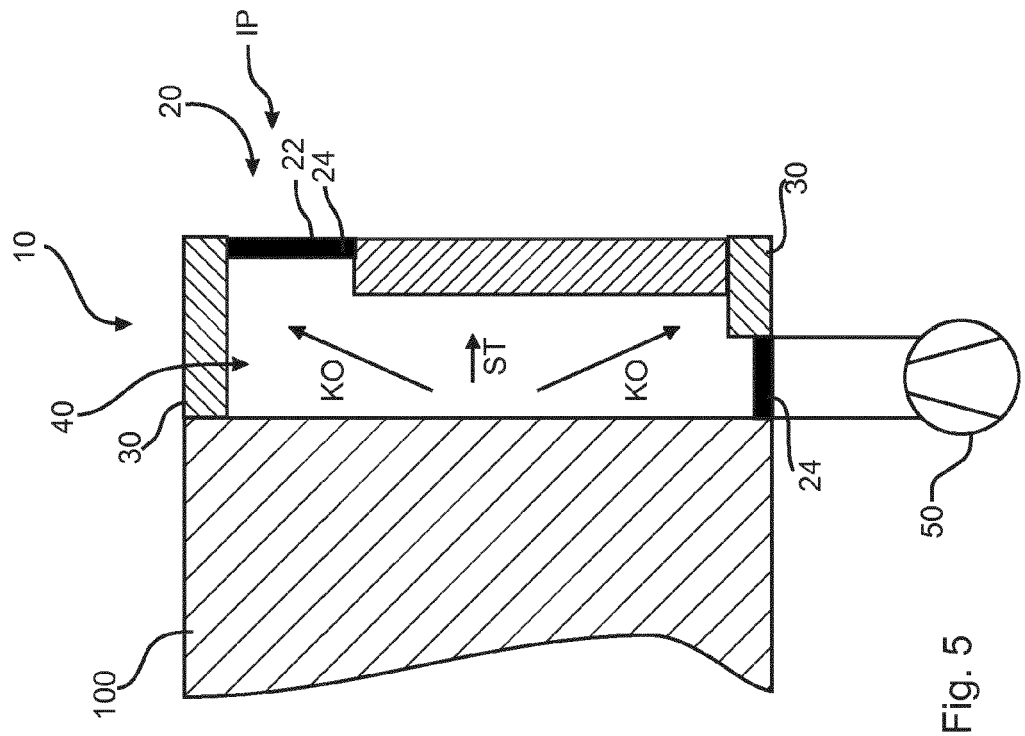
Figure 8:
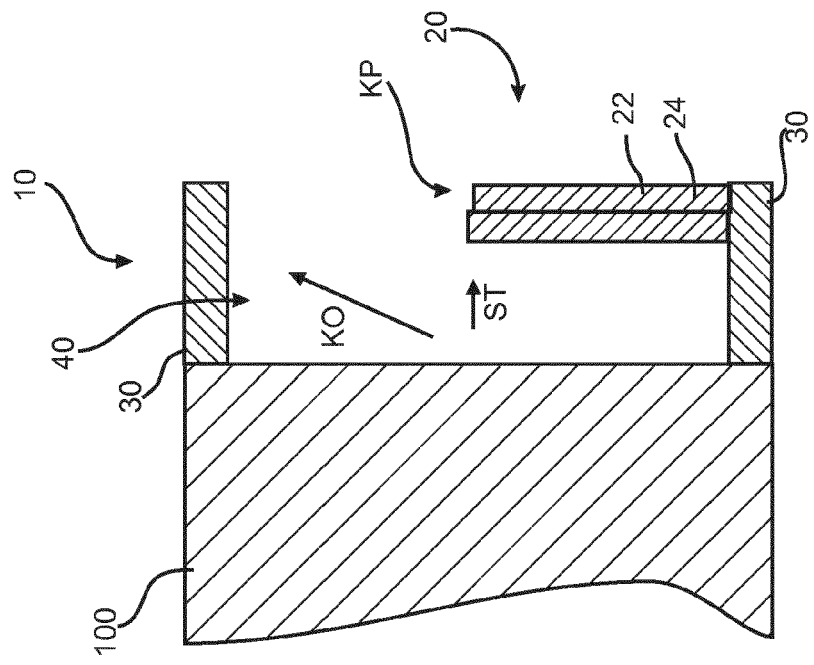
Figure 7:
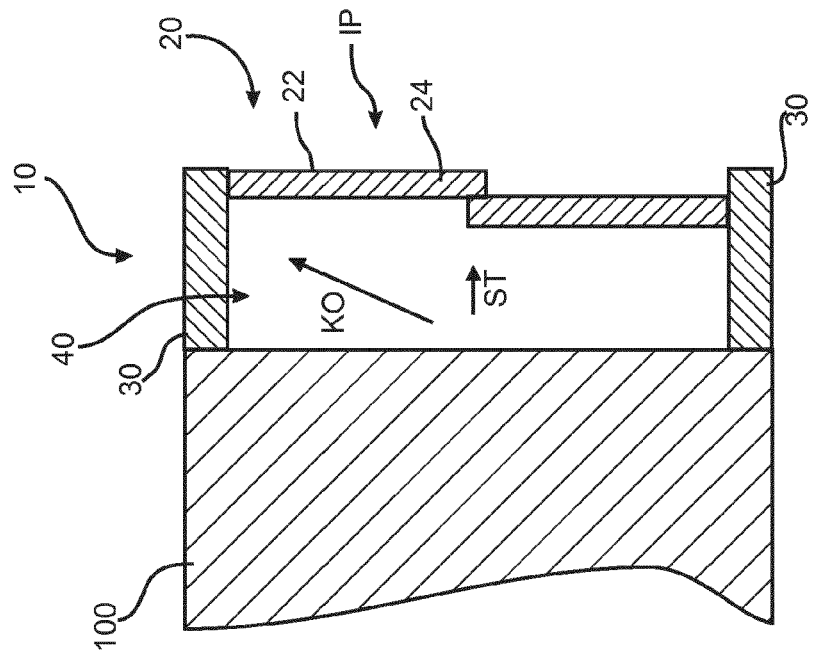
Figure 10:
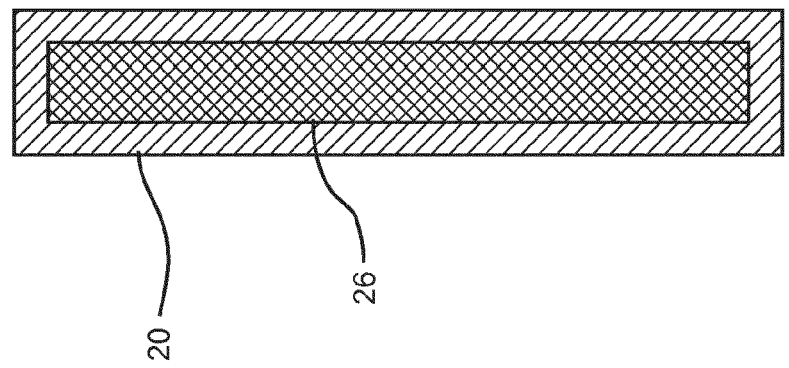
Figure 9:
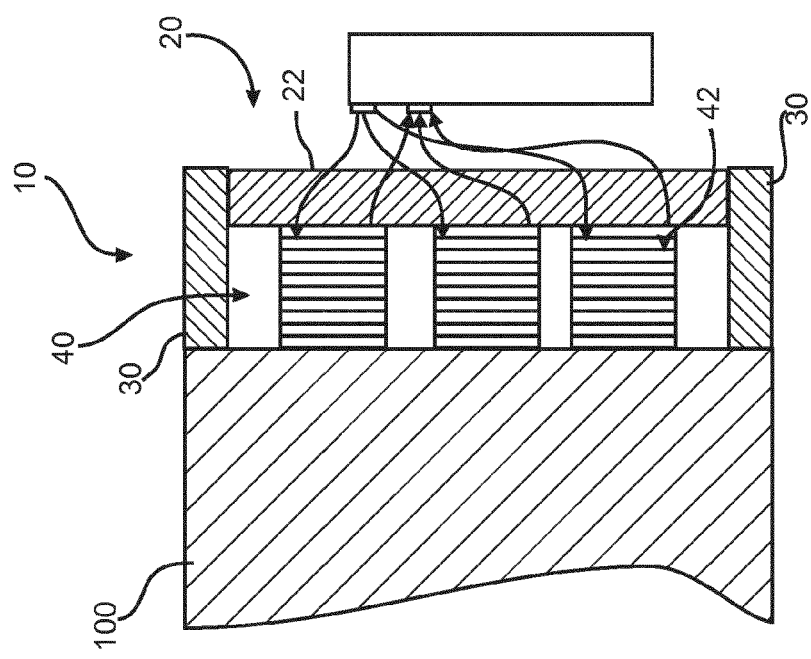

Further advantages, features and details of the invention result from the subsequent description in which embodiments of the invention are described in detail in relation to the drawings. Thereby, the features described in the claims and the description can be essential for the invention each single for themselves or in any combination. It is shown schematically:

FIG. 1 a first embodiment of a blown film extrusion device according to the invention, FIG. 2 the embodiment of FIG. 1 with the elements in a cooling position, FIG. 3 a further embodiment of a blown film extrusion device according to the invention, FIG. 4 the embodiment of FIG. 3 with the cooling flaps in a cooling position, FIG. 5 a further embodiment of a blow head extrusion device according to the invention, FIG. 6 the embodiment of FIG. 5 with the cooling flap in a cooling position, FIG. 7 a further embodiment of a blown film extrusion device according to the invention, FIG. 8 the embodiment of FIG. 7 with the cooling flap in a cooling position, FIG. 9 a further embodiment of the blown film extrusion device according to the invention, FIG. 10 an embodiment of an insulation according to the invention, FIG. 11 a further embodiment of a cooling flap and FIG. 12 the embodiment of FIG. 11 with the cooling flap in a cooling position.

FIGS. 1 and 2 show a first embodiment of a blown film extrusion device 10 according to the invention. This is assembled about a blow head 100, wherein hereby a carrier structure 30, not described in detail, generates the assembly in a shown manner. Thereby, an insulating gap 40 is configured between the insulation 20 and the blow head 100. The FIG. 1 shows single elements 22 for controlling the heat resistance in form of cooling flaps 24 in the insulating position IP while FIG. 2 shows all cooling flaps 24 in the cooling position KP. With this embodiment the cooling occurs by heat convection and heat radiation.

The FIGS. 3 and 4 schematically show a cross section of the embodiment of FIG. 1 and FIG. 2. In the FIGS. 3 and 4 the blow head 100 and the elements 22 configured as cooling flaps 24 are shown in a schematic cross section. With schematic arrows the heat convection KO and the heat radiation ST are shown in the cooling gap 40. If by flapping of the cooling flaps 24 the cooling flap 24 is moved from the insulating position IP into the cooling position KP according to FIG. 4 a heat exposure can occur by convection KO and heat radiation ST. Further, the axis of rotation or the opening axis 25 of the cooling flap 24 can be recognized.

In the FIGS. 5 and 6 an embodiment of the cooling flaps 24 of the elements 22 can be recognized, which enable a stack effect. Thus, a first cooling flap 24 is assembled axially on the lower side and the second cooling flap 24 is assembled axially on the other side. In the open state, meaning in the cooling position KP, according to FIG. 6 a stack effect evolves which positively affects the heat exposure by convection. Additionally, for support and for generating of a forced convection a blown device 50 is intended.

Likewise, FIGS. 7 and 8 show a further embodiment of a blown film extrusion device according to the invention. Hereby, a telescopic structure of the cooling flap 24 of the element 22 is provided so that by an axial displacement of an outer cylinder sleeve relative to an inner cylinder sleeve a reduction of the axial extension of the insulation 20 is provided and therewith an opening is released. Therewith, again heat radiation ST and convection KO can escape from the blow head 100 or from the insulation gap 40.

FIG. 9 shows a further solution of a blown film extrusion device 10 according to the invention, by which within the insulation gap 40 single temperature devices 42 are assembled as possibilities for elements 22 within the insulation gap 40. The elements can for example be heating bands flown through with temperate oil or electrically controlled Peltier elements.

FIG. 10 schematically shows a possible sandwich structure of the insulation 20, wherein within this insulation 20 an insulation material 26 is assembled. This is for example a so called aerogel mat. Ideally, the inner side of the sandwich structure should be completely thermally separated from the outer side so that no heat bridges between the inner side and the outer side occur.

The FIGS. 11 and 12 show a further embodiment of a possible cooling flap 24 of the elements 22. This is configured in two parts so that by opening via an opening axis 25 via a folding axis 23 a reduction of the geometric area extension of the cooling flaps 24 can occur. Therewith, also in cramped conditions a possibly high opening cross sectional area is provided in order to achieve a possibly high cooling capacity.

The description of the previous embodiments describes the present invention only within the scope of examples. Naturally single features of the embodiments as far as technically meaningful can be combined with one another without leaving the scope of the present invention.

LIST OF REFERENCE CHARACTERS

10 Blown film extrusion device
20 Insulation
22 Element for controlling the thermal resistance
23 Folding axis
24 Cooling flap
25 Opening axis
26 Insulation material
30 Carrier structure
40 Insulation gap
42 Thermal regulation device
50 Blower device
100 Blow head
IP Insulation position
KP Cooling position KO Convection
ST Radiation

The invention claimed is:

1. A blown film extrusion device comprising:
a blow head configured to extrude blown film; and
an adjustable thermal insulation structure directly adjacent to at least a portion of an outer sidewall of the blow head to provide selective thermal insulation of the blow head in relation to ambient air, the adjustable thermal insulating structure comprising:
at least one insulating air gap chamber thermally contacting the blow head configured to extrude the blown film; and
at least one flap, movably mounted between an insulation position closing the insulating air gap chamber to ambient air and a cooling position opening the insulating air gap chamber to ambient air, heat transfer from the blow head being completely controllable by controlling access of ambient air into the insulating air gap chamber.

2. The blown film extrusion device according to claim 1, further comprising an electrically controllable blower that influences an air stream.

3. The blown film extrusion device according to claim 1, wherein the at least one flap comprises a plurality of flaps connected to one another via a motor-driven gear arrangement.

4. The blown film extrusion device according to claim 1, further comprising:
a heater integrated in the blow head; and
a temperature controller providing a first control signal for controlling a heat performance of the heater and a second control signal for controlling thermal resistance.

5. A method of temperature controlling of a blown film extrusion device,
wherein the blown film extrusion device comprises:
a blow head configured to extrude blown film, the blow head including a heater integrated therein; and
an adjustable thermal insulation structure directly adjacent to at least a portion of an outer sidewall of the blow head to provide selective thermal insulation of the blow head in relation to ambient air, the adjustable thermal insulating structure comprising:
at least one insulating air gap chamber thermally contacting the blow head configured to extrude the blown film; and
at least one flap, movably mounted between an insulation position closing the insulating air gap chamber to ambient air and a cooling position opening the insulating air gap chamber to ambient air, heat transfer from the blow head being completely controllable by controlling access of ambient air into the insulating air gap chamber, and
wherein the method comprises:
controlling a heat performance of the heater; and
controlling thermal resistance of the blown film extrusion device.

6. A blown film extrusion device comprising:
a blow head having an annular nozzle configured to extrude a blown film of melted thermoplastic; and
an annular adjustable thermal insulation structure directly adjacent to at least a portion of an outer sidewall of the annular nozzle of the blow head to provide selective thermal insulation of the blow head in relation to outside ambient air, the annular adjustable thermal insulating structure comprising:
at least one annular insulating air gap chamber that is in thermal contact with the annular nozzle of the blow head by annularly surrounding the blow head; and
at least one flap annularly surrounding the at least one annular insulating air gap, the at least one flap being movably mounted between an insulation position closing the at least one annular insulating air gap chamber from the outside ambient air and a cooling position opening the at least one annular insulating air gap chamber to the outside ambient air, whereby heat transfer from the blow head is completely controllable by controlling access of the outside ambient air into the at least one annular insulating air gap chamber by moving the at least one flap.

* * * * *